Patented May 13, 1941

2,241,770

UNITED STATES PATENT OFFICE 2,241,770

STABILIZATION OF STYRENE AND RELATED COMPOUNDS

Robert R. Dreisbach, Sylvia M. Stoesser, and Alden W. Hanson, Midland, Mich., assignors to The Dow Chemical Company, Midland, Mich., a corporation of Michigan No Drawing. Application June 4, 1937, Serial No. 146,519

3 Claims. (Cl. 260—669)

This invention concerns the stabilization of polymerizable unsaturated organic compounds, particularly styrene and its homologues and analogues, and products comprising or prepared from the stabilized materials. It also concerns an improved method of purifying and utilizing such polymerizable compound involving initial stabilization of the same against undesired polymerization.

In the manufacture of styrene and other polymerizable organic compounds difficulty is frequently encountered in purifying and marketing the products, due to their tendency to polymerize when heated, e. g. distilled, or permitted to stand. For the purpose of overcoming such difficulties it has been proposed that certain relatively high boiling compounds, such as quinone, trinitrobenzene, etc., which have the property of inhibiting polymerization of styrene, be added to the latter prior to distilling or storing the same. Such inhibiting agents have certain objectionable characteristics. For instance, they usually discolor or otherwise unfavorably affect resins prepared from styrene containing the same and must be removed prior to polymerizing the styrene in order to obtain a polymer having satisfactory properties. Furthermore, such relatively high boiling inhibitors are only partially effective in inhibiting polymerization during distillation of styrene, since, as set forth in the co-pending application of Dreisbach et al., Serial No. 146,518, filed June 4, 1937, the polymerization which normally occurs during the distillation takes place to considerable extent in the distilling column.

We have found that phenylacetylene is an effective agent for inhibiting the polymerization of styrene and related compounds and that it may be employed without encountering difficulties such as those mentioned above. More specifically, we have discovered that phenylacetylene is an effective agent for inhibiting polymerization of polymerizable organic compounds, such as styrene and its homologues and analogues. During distillation of a solution of phenylacetylene in styrene the phenylacetylene distills together with the styrene, thereby inhibiting polymerization of the latter both in the still pot and the distilling column and yielding as distillate a solution of phenylacetylene in styrene which is quite stable against polymerization at room temperature or thereabout. The phenyacetylene used to inhibit polymerization of styrene, etc., may be removed, if desired, by chemical treatment to recover the styrene or other polymerizable compound in pure and readily polymerizable condition.

The invention, accordingly consists in the method for treating polymerizable unsaturated organic compounds and in certain new products prepared by such method, hereinafter fully described and particularly pointed out in the claims.

In practicing the invention a polymerizable unsaturated organic compound such as styrene, is stabilized against polymerization by means of phenylacetylene. The latter may be employed beneficially in any proportion, although certain proportions, which vary somewhat depending on the object of the treatment, are preferred. When the object is merely to stabilize the polymerizable compound for purpose of storing or shipping it in liquid form, the phenylacetylene is preferably employed in the lowest proportion which will produce a composition of the desired stability. For such purpose styrene is preferably treated with from 0.1 to 10 per cent its weight of phenylacetylene, depending on the time for which it is to be stored and the temperature to which it will be exposed during storage or shipment.

The degree of stabilization brought about by incorporating various proportions of phenylacetylene in styrene is illustrated in the following Table 1. Example 1 of the table gives the specific gravity at 180° F. with respect to water at the same temperature and also the absolute viscosity in millipoises at 180° F. of pure freshly-distilled styrene. Example 2 gives similar data concerning styrene of the same quality which after being distilled has been permitted to stand at room temperature in the absence of light for two weeks. Examples 3-7 give corresponding constants for a number of solutions of phenylacetylene in styrene which, after preparation from freshly distilled styrene and phenylacetylene, had been permitted to stand in the dark at room temperature for two weeks. The table states the per cent by weight of phenylacetylene in each such solution.

Table I

| Example | Phenyl-acetylene | Sp. Gr. 180°/180° F. | Viscosity, milli-poises at 180° F. | Comment |
|---|---|---|---|---|
| | Percent | | | |
| 1 | 0 | 0.874 | 3.8 | Freshly distilled styrene. |
| 2 | 0 | Too viscous to test | Too viscous to test | Styrene after 2 weeks standing. |
| 3 | 0.03 | 0.890 | 4067 | Viscous. |
| 4 | 0.15 | 0.884 | 662 | Free flowing. |
| 5 | 0.30 | 0.882 | 687 | Do. |
| 6 | 0.60 | 0.882 | 232 | Do. |
| 7 | 3.00 | 0.876 | 6.5 | Thin liquid. |

The above table demonstrates that as little as 0.03 per cent by weight of phenylacetylene in styrene retards polymerization of the latter to a noticeable extent and that 3 per cent of phenylacetylene in styrene substantially prevents polymerization of the latter under the conditions mentioned above. Styrene containing larger amounts of phenylacetylene is, of course, even more stable against polymerization.

When phenylacetylene is employed for the purpose of inhibiting polymerization during distillation of styrene, it is ordinarily used in a proportion representing from 2 to 10 per cent by weight of the styrene.

A colorless solution of phenylacetylene in styrene which is substantially stable against polymerization at room temperature may be prepared by treating crude discolored styrene, e. g. the dark solution of styrene, ethylbenzene, and benzene ordinarily obtained when ethylbenzene is pyrolyzed, with 2 per cent by weight or more of phenylacetylene and fractionally distilling the treated mixture, preferably under vacuum. The phenylacetylene distills together with the styrene, thereby inhibiting polymerization from occurring either in the still pot or the distilling column. The fraction distilling at temperatures between 78° and 80° C. at 100 mm. is a solution of phenylacetylene in styrene which is far more stable than styrene alone at room temperature, and which may be stored or shipped without polymerizing to a solid.

After storage or shipment, the phenylacetylene may be removed in any of several ways. For instance, a solution of phenylacetylene in styrene may be treated with an ammoniacal silver nitrate solution to precipitate the phenylacetylene as its silver salt or it may similarly be treated with an ammoniacal cuprous chloride solution to precipitate the copper salt of the phenylacetylene. In either of said procedures the silver nitrate or cuprous chloride is employed in amount approximately molecularly equivalent to the phenylacetylene, the precipitated metal phenylacetylide is separated, e. g. by filtration, and the styrene is purified by distillation.

In practice, we preferably remove phenylacetylene from a solution thereof in styrene by agitating such solution with a mixture of mercuric oxide and a 30%-70% sulphuric acid solution at room temperature for about 0.5 hour or longer. The mercuric oxide and aqueous sulphuric acid may be employed in widely varying proportions, but we usually employ about 1 mole of mercuric oxide per mole of phenylacetylene to be removed and we employ the aqueous sulphuric acid in a proportion representing one quarter or more the volume of styrene and phenylacetylene solution treated. Following such treatment, the mixture is permitted to settle with formation of an upper styrene layer and a lower sulphuric acid layer. The upper layer is separated, neutralized by the treatment with a base such as sodium carbonate, sodium bicarbonate, sodium hydroxide, etc., and styrene is distilled therefrom. The recovered styrene is substantially pure and readily polymerizable.

Although the foregoing description of the invention has for sake of clarity been limited to the stabilization of styrene by treating the latter with phenylacetylene, other polymerizable unsaturated organic compounds, such as vinyl acetate, para-chlorostyrene, para-methylstyrene, vinyl-ethyl-benzene, divinyl benzene, vinyl naphthalene, etc., may be similarly stabilized with phenylacetylene. Certain of such stabilized compositions, e. g. those comprising para-methylstyrene, para-chlorostyrene, vinyl-ethylbenzene, divinyl benzene, etc., may be distilled to obtain a distillate comprising the polymerizable compound and phenylacetylene, the latter serving to inhibit polymerization during the distillation.

Other modes of applying the principle of the invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:

1. The method which comprises stabilizing a polymerizable vinyl compound against polymerization during storage and distillation by treating the same with phenylacetylene, and thereafter removing the phenylacetylene to recover the vinyl compound in readily polymerizable form.

2. The method which comprises stabilizing styrene against polymerization during storage and distillation by forming a mixture thereof with phenylacetylene and thereafter removing the phenylacetylene from solution in the styrene to recover the latter in readily polymerizable form.

3. The method which comprises removing phenylacetylene from styrene by treating the same with a solution of mercuric oxide in aqueous sulphuric acid, agitating the resultant mixture at approximately room temperature, thereafter permitting the mixture to settle and form two layers and separating the organic layer from the aqueous layer.

ROBERT R. DREISBACH.
SYLVIA M. STOESSER.
ALDEN W. HANSON.